United States Patent
Lees et al.

(10) Patent No.: US 11,870,869 B2
(45) Date of Patent: Jan. 9, 2024

(54) ACCOUNT LINKING SYSTEM

(71) Applicant: Checkout Smart Ltd., London (GB)

(72) Inventors: Paul Lees, Hazelmere (GB); David Martindale, Langdon Hills (GB)

( * ) Notice: Subject to any disclaimer, the term of this patent is extended or adjusted under 35 U.S.C. 154(b) by 0 days.

(21) Appl. No.: 17/865,956

(22) Filed: Jul. 15, 2022

(65) Prior Publication Data
US 2023/0016076 A1    Jan. 19, 2023

(30) Foreign Application Priority Data
Jul. 16, 2021  (GB) ..................... 2110259

(51) Int. Cl.
*G06Q 30/0601* (2023.01)
*H04L 67/567* (2022.01)
*G06Q 30/0234* (2023.01)

(52) U.S. Cl.
CPC ....... *H04L 67/567* (2022.05); *G06Q 30/0234* (2013.01); *G06Q 30/0631* (2013.01)

(58) Field of Classification Search
CPC ... H04L 67/567; H04L 67/53; G06Q 30/0234; G06Q 30/02; G06Q 10/087; G06Q 30/0631; G06Q 30/06; G06Q 30/08
See application file for complete search history.

(56) References Cited

U.S. PATENT DOCUMENTS

| | | | | |
|---|---|---|---|---|
| 2003/0233276 A1* | 12/2003 | Pearlman | ........... | G06Q 30/0222 705/14.23 |
| 2013/0290096 A1* | 10/2013 | Lizotte, III | ........ | G06Q 30/0246 705/14.45 |
| 2015/0088607 A1* | 3/2015 | Georgoff | ........... | G06Q 30/0202 705/14.46 |
| 2016/0104189 A1* | 4/2016 | Marcus | ............. | G06Q 30/0213 705/14.34 |
| 2019/0378143 A1* | 12/2019 | Volpi | ..................... | G06Q 30/02 |

* cited by examiner

*Primary Examiner* — Chris Parry
*Assistant Examiner* — Hassan A Khan
(74) *Attorney, Agent, or Firm* — Schmeiser, Olsen & Watts LLP

(57) ABSTRACT

Described is an account linking system. The system includes a server having a memory for storing information and a user computing device coupled to the server. The account linking system may operate to enable a shopper to verify their purchase of an item by extracting a user's purchase history, leave a review of the associated item on the website of one or many third-party retailers and/or take other logged in actions on a single app.

9 Claims, 3 Drawing Sheets

ACCOUNT LINKING SYSTEM

CROSS REFERENCE TO RELATED APPLICATION

This application claims priority to G.B. Application No.: 2110259.5 entitled "Mobile App System and Architecture," filed 16 Jul. 2021, the disclosure of which is hereby incorporated entirely herein by reference.

BACKGROUND OF THE INVENTION

Technical Field

This invention generally relates to a system for account linking, particularly an account linking shopping system.

State of the Art

Companies (brand owners) that have products which are sold by third party retailers often wish to monitor the sale, promotion, and other aspects of their products by the third parties; this can be done by surveying customers, for example asking if they have brought a particular product and from which retailer; however, those surveyed may recall inaccurately. Also, such surveys are inconvenient and time consuming both to the company and those being surveyed. A company can approach the retailers directly, but the retailer may regard the information as sensitive, or may provide inaccurate or misleading information.

Companies may also wish to verify a consumer has purchased their product, for example if they run a promotion which has a reward which the consumer claims. Currently, this may be carried out by requiring the consumer to mail in a proof of purchase, submit a code on the product, or scan a receipt. These methods are inconvenient for the consumer, as well as for the companies to administer and make it difficult to scale such promotions.

Accordingly, what is needed is a system for account linking integrated in a single platform that enables a shopper to verify their purchase of an item, leave a review of the associated item on the website of one or more third-party retailers, and/or take other type of logged-in action, such as extract purchase history, return warranty/subscription information etc.

SUMMARY OF THE INVENTION

The disclosed invention relates to an account linking shopping system. The account linking shopping system includes integration into a single platform, such as a website/mobile app, of all functionalities required to enable a shopper to verify their purchase of an item (extract purchase history), leave a review of the associated item on the website of one or many third party retailers and/or take other type of logged-in actions, such as extract return warranty/subscription information etc.

Disclosed is an account linking data shopping system comprising: a server having a memory for storing user information; and at least one user computing device coupled to the server, wherein the server is programmed to: receive and process a signal that the at least one user computing device has accessed the system and is searching for at least one third party retailer; send for display on the at least one user computing device the information comprising at least one third party retailer website and/or app; receive and process a signal from the at least one user computing device comprising a user defined item displayed on the at least one user computing device; verify purchase of the item by extracting a user's purchase history; leave a review of the item on the website and/or app of the at least one third-party retailer; and data sharing to the at least one third party retailer, wherein the data sharing to the at least one third party retailer is rewarded.

The at least one user computing device may be a mobile computing device. A mobile application may operate on the at least one user computing device. A communication interface is displayed on the at least one user computing device. The user information may comprise username and/or password. The server may be further programmed to automatically perform searches of various databases for available item level rebate information. The server may generate for display on the at least one user computing device the available item level rebates.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an account linking system for completing logged-in actions on a third party website/mobile app. The account linking system enables logged-in actions to be taken on any third party website and/or app, such as retail, entertainment, and/or health. In an account linking shopping system, the anonymized reporting purposes comprise check for rebates, check and place product review and bring back purchase history.

Figure 1:
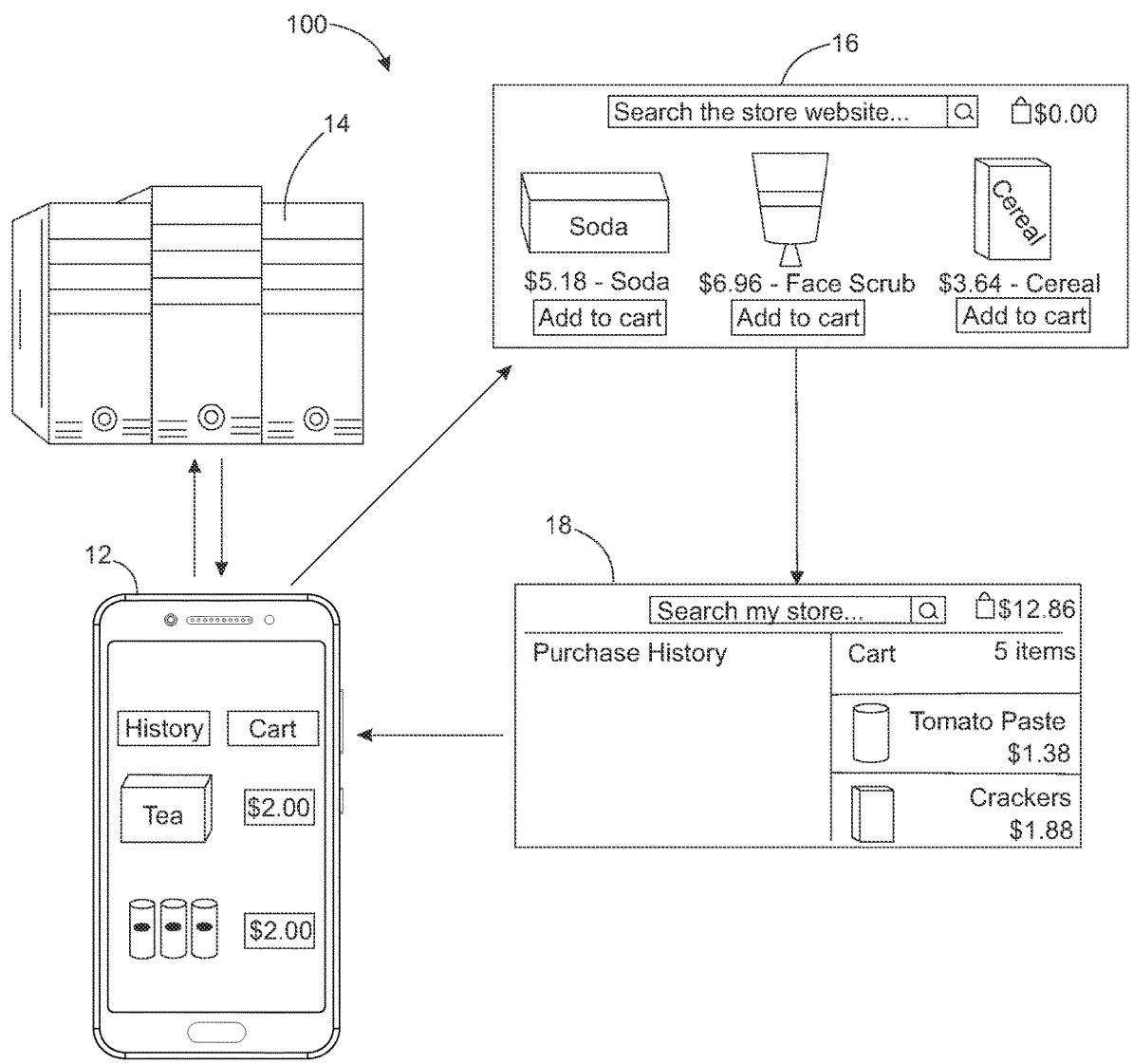
FIG. 1 a diagrammatic view of an account linking system according to an embodiment.

FIG. 1 depicts an embodiment of an account linking shopping system 100. The system 100 may include user computing device(s) 12 and a server 14, wherein each user computing device 12 is coupled to the computer server 14. This coupling may be a network connection, such as a wireless connection through an Internet connection, a Wi-Fi connection, a Bluetooth connection, or the like, wherein the user computing devices 12 may communicate with and receive communication from the server 14. The user computing device 12 may be a mobile device, a desktop computer, a laptop, a tablet, a smartphone, wearable devices, and the like. The server 14, in some embodiments, may be a computer server or a cloud-based infrastructure architecture. The server 14 may include a memory storing various data. The memory of the server 14 may store user information such as username, password, and order history.

The user opens the application on the user computing device 12 and enters username and password for their e-commerce accounts. The username and password are encrypted and stored on the user computing device 12. The app downloads updated logic comprising JavaScript Object Notation (JSON) instructions for accessing the user computing device e-commerce accounts together with the date of most recently ported order. The app checks for website credentials previously stored in encrypted form on user computing device 12. Using stored user credentials sand internet access, the app navigates to and logs into website using invisible browser from the user computing device 12. Where the use is to extract purchase history or verify purchase in relation to qualification for a rebate the browser navigates to purchase history 16 (such as a my orders display) and ports updated order history to user computing device 12. The order history 18 is transmitted from the user computing device to the server 14 for anonymized reporting purposes. Other uses include, but are not limited to, post a product review to a third party retailer site A mobile app may be downloaded by the user on to a mobile device 12, for example via a mobile device app store. Once the app has been installed, the user may open the mobile app, and may be prompted to register with the system administering the mobile app system, the mobile app establishes a connection with the organization server 14 and the user's details are stored in a user database.

The user is also prompted to enter the username and password for target retailer sites that may be accessed through the mobile device 12. Each username and password pair is encrypted and stored in a database on the mobile device 12 accessible by the mobile app. The storage of the usernames and passwords of a user on their mobile device reduces the risk of their accounts being compromised by hacking.

The mobile app downloads instructions or logic from the organization server 14 relating to target third party retailer sites. These instructions may include data fields that have to be completed in order to access a user account, commands or links which must be followed to return information on the user account. The instructions may conveniently be contained in a JavaScript file. The instructions are periodically updated, particularly when the format of the target retailer site changes. The list of target third party retailer sites on the mobile device 12 may also be updated by the organization server 14 when the system wishes to investigate another third party retailer site.

In order to retrieve information from a third party retailer site for example, a user's purchase history, the mobile app retrieves the user credentials from the username and password database and contacts the third party retailer site and enters the user credentials. This may conveniently be carried out using the web browser of the user's mobile device 12.

The user may be informed that such a retrieval is taking place and asked to agree to it. Further, when the mobile app attempts to log in to the user's account on a particular third party retailer site, the third party retailer site may invoke an authentication process to establish that the login event is being carried out under human supervision or require some other confirmation; this may take the form of challenge requiring a response from the user. In such a case, the mobile app alerts the user and displays the requirement for the user to respond as required in order to complete the login or other process.

The mobile app then navigates to the purchase history page 16 using the instructions stored on the mobile device 12 by the mobile app. The required information is then retrieved from the purchase history page 16 and transmitted to the organization server 14 for subsequent use. For example, the fact that the user has purchased a particular item qualifying for a reward may be confirmed. The retrieved information may also be used for other market research purpose; it can be anonymized to preserve the user's privacy if necessary. Other information besides purchase history may be retrieved by the user account; for example, the items promoted by the retailer site to the particular user may be retrieved.

The mobile app may also post material on behalf of the user; for example, a user may agree to post a review in return for a reward; when the user has applied for the reward, the organization server 14 may instruct the mobile app to log in to the third party retailer site, or a third party review site, and post a review on the user's behalf.

The system may also use the mobile app to retrieve more general information that third party retail sites and other sites display to the particular user. For example, a search using the Google™ search interface may be tailored to a particular user, and the mobile app could check to see how a product is ranked for the user by the Google™ search interface. The mobile app may be used by the system in order to access and retrieve information and interact with web sites on the internet. In this manner, the user's mobile device 12 may be used as a proxy server by the organization server 14.

The system/organization administering the mobile app can then extract/post data to a user's e-commerce account in a distributed manner (i.e., from the user's mobile device 12 and without the system server ever interacting with the third party retailer site), executed in a way that is private and secure, without the third party retailer site or any other site, being aware of the system's involvement. This allows the system to gain an objective and accurate insight into material exactly as it is displayed to the user. Further, it allows the system to gain a complete picture over many third party retailers, and for all products brought by subscribed users over the time period of their stored purchase history, without inconveniencing the users. There is no direct interaction between the organization server 14 and the third party retailer sites, review sites, or other sites which may be accessed by the mobile device 12. The system can then gather information from a comprehensive range of third party retailers and requires no integration or inconvenience to third party retailers' systems.

The system enables logged-in actions to be taken on any third-party app/website. This may be done with the user's full consent and for their benefit. Examples of these actions by the user include, but are not limited to: logging into e-commerce accounts and sharing details of latest orders in return for rewards, including but not limited to cash, points, and/or gift cards; logging into e-commerce accounts and sharing details of their latest orders in return for alerts on, for example, lower prices, returns, and/or analysis of nutritional content; logging into e-commerce accounts and posting a product review of an item, whereby syndicating the review to multiple sites rather than require the user to log in and post to each site individually; and logging into subscription accounts to notify of subscription information, such as renewal dates.

Figure 2:
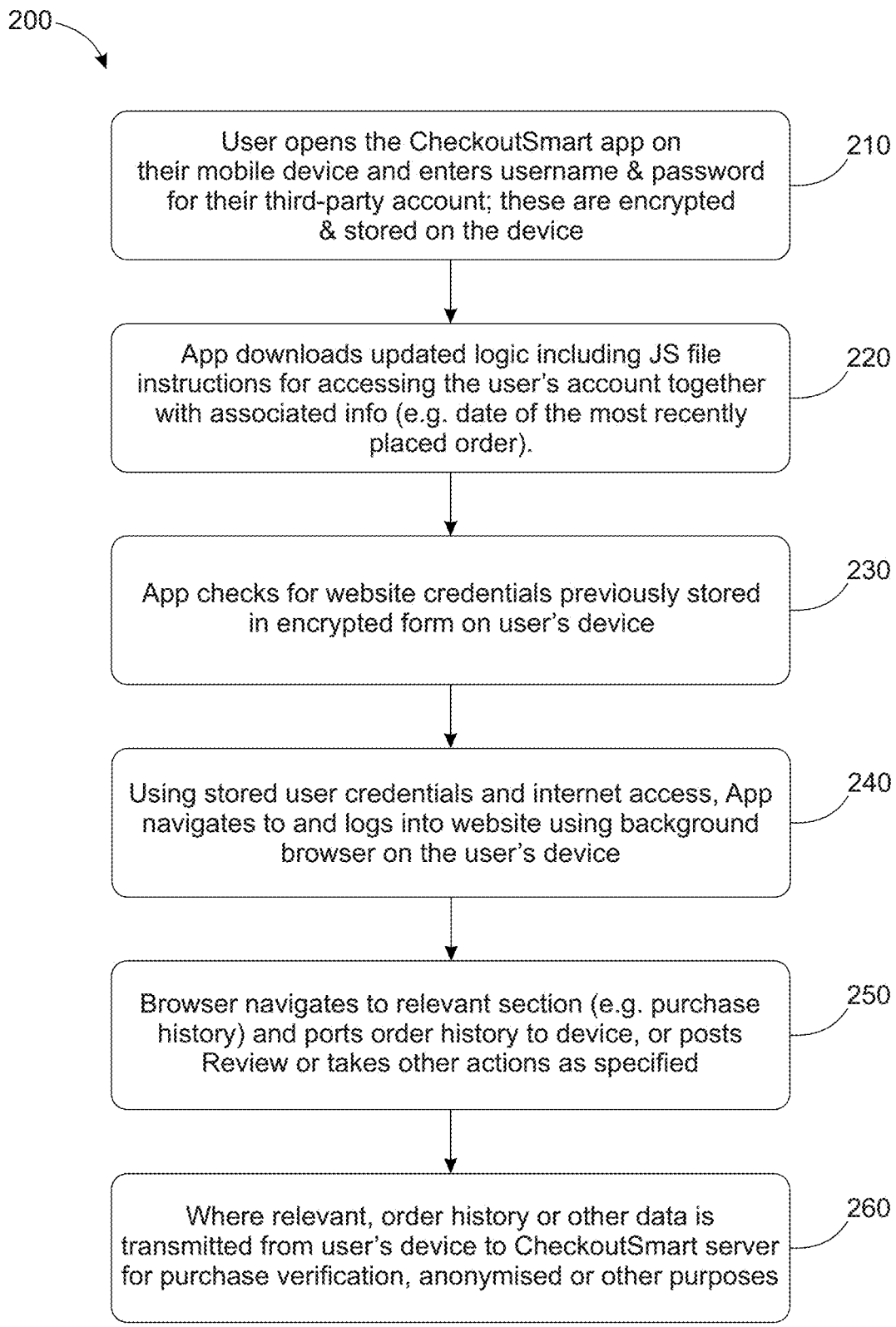
FIG. 2 is a diagrammatic view of an account linking system according to an embodiment.

As shown in FIG. 2, embodiments may also include a method 200 comprising opening the account linking app on their mobile computing device and entering username & password for their third party account 210. The username and password may be encrypted and stored on the mobile computing device. The account linking app downloads updated logic including JavaScript (JS) file instructions for accessing the user's account together with associated information, including, but not limited to, date of the most recently posted order 220. The account linking app checks for website credentials previously stored in encrypted form on user's device 230. Using stored user credentials and internet access, the account linking app navigates to and logs into website using a background browser on the user's device 240. The browser navigates to relevant section Purchase history) and imports order history to mobile computing device, posts review and/or takes other actions as specified 250. Order history or other data may be transmitted from a user's device to server for purchase verification, anonymised reporting and/or other purposes 260.

Figure 3:
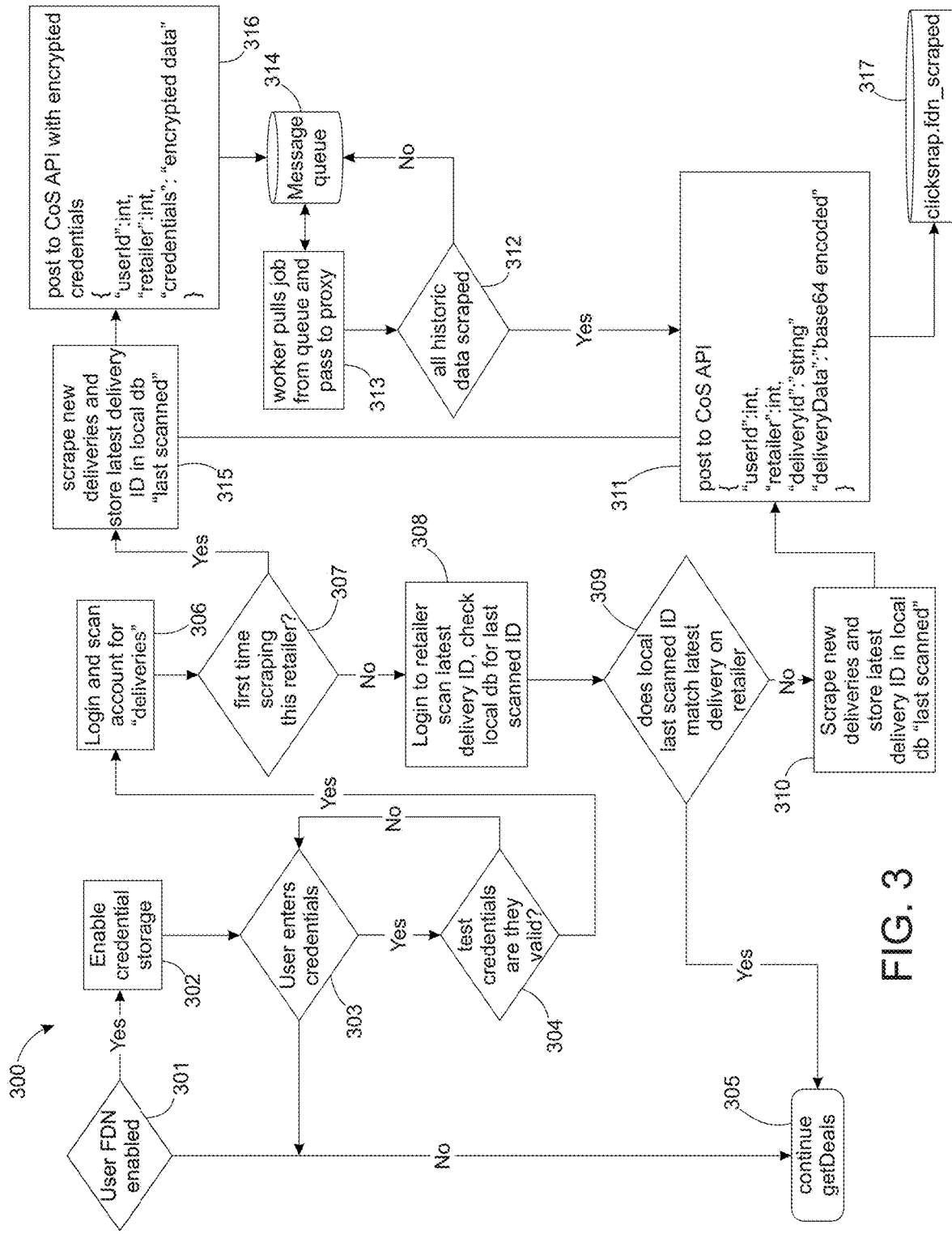
FIG. 3 is a schematic view of an account linking system according to an embodiment.

FIG. 3 shows an overview of the account linking shopping system 300. System 300 starts user fixed dialing number (fdn) enabled step 301. If no, go to step 305 continue to get deals. If yes, go to step 302 enable credential storage then to step 303 user enters credentials. If no, go to step 305 continue to get deals. If yes, go to step 304 test credentials, are they valid? If no, then back to step 303. If yes, go to step 306 login and scan account for deliveries then step 307 first time scraping (process of extracting large amounts of information from a website/app) this retailer website/app? If no, then step 308 login to retailer website/app to scan latest delivery ID and check local database for last scanned ID then step 309 to resolve a decision as to does local last scanned ID match latest delivery on retailer website/app? If yes, then back to step 305. If no, then step 310 scrape new deliveries and store latest delivery ID in local database "last scanned" followed by step 311 post to class of service (CoS) on an application programming interface (API) then step 317 scraped and end. If yes to step 307 then step 315 scrape new deliveries and store latest delivery ID in local database "last scanned" followed by step 316 post to CoS on API with encrypted credentials. Next step 314 message queue followed by step 313 worker pulls job from queue and passes to proxy then step 312 all historic data scraped. If yes go to step 312 and if no go back to step 314.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An account linking data shopping system comprising:
a server having a memory for storing user information; and
at least one user computing device coupled to the server, wherein the server is programmed to:
receive and process a signal that the at least one user computing device has accessed the system and is searching for at least one third party retailer;
send for display on the at least one user computing device the information comprising a website or application of at least one third party retailer;
receive and process a signal from the at least one user computing device comprising a user defined item displayed on the at least one user computing device;
verify purchase of the item by extracting a user's purchase history;
instruct the at least one user computing device to post a review of the item on the website or application of the at least one third party retailer; and
data sharing to the at least one third party retailer, wherein the data sharing is rewarded, wherein the server instructs the website or application to log in to the third party retailer site or a third party review site and post the review on behalf of a user of the at least one user computing device.

2. The account linking shopping system of claim 1, wherein the at least one user computing device is a mobile computing device.

3. The account linking shopping system of claim 1, wherein a mobile application operates on the at least one user computing device.

4. The account linking shopping system of claim 1, wherein a communication interface is displayed on the at least one user computing device.

5. The account linking shopping system of claim 1, wherein the user information comprises username and/or password.

6. The account linking shopping system of claim 1, wherein the server is further programmed to automatically perform searches of various databases for available item level rebate information.

7. The account linking shopping system of claim 6, wherein the server generates for display on the at least one user computing device the available item level rebates.

8. The account linking shopping system of claim 1, wherein the review is syndicated to more than one website or application.

9. An account linking data shopping system comprising:
a server having a memory for storing user information; and
at least one user computing device coupled to the server, wherein the server is programmed to:
receive and process a signal that the at least one user computing device has accessed the system and is searching for at least one third party retailer;
send for display on the at least one user computing device the information comprising a website or application of at least one third party retailer;
receive and process a signal from the at least one user computing device comprising a user defined item displayed on the at least one user computing device;
verify purchase of the item by extracting a user's purchase history;
instruct the at least one user computing device to post a review of the item on the website or application of the at least one third party retailer, wherein the review is rewarded; and
data sharing to the at least one third party retailer, wherein the data sharing is rewarded, wherein the server instructs the website or application to log in to the third party retailer site or a third party review site and post the review on behalf of a user of the at least one user computing device.

* * * * *